Nov. 10, 1959 W. R. HICKS 2,911,882
SOUND RECORDING ATTACHMENT FOR MOTION PICTURE CAMERAS
Filed March 15, 1956 2 Sheets-Sheet 2

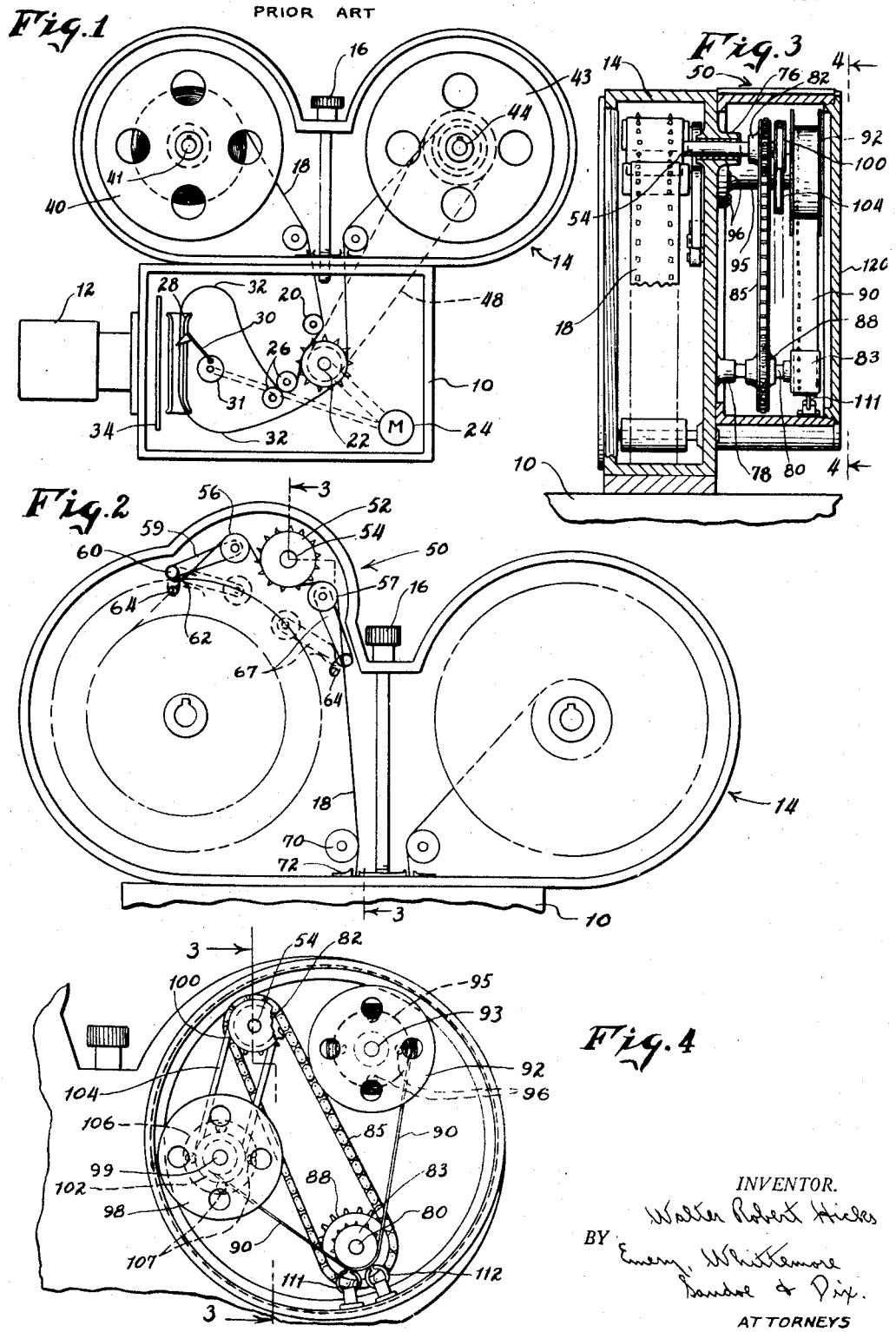

INVENTOR.
Walter Robert Hicks
BY Emery, Whittemore,
Sanford & Dix
ATTORNEYS

United States Patent Office 2,911,882
Patented Nov. 10, 1959

2,911,882

SOUND RECORDING ATTACHMENT FOR MOTION PICTURE CAMERAS

Walter Robert Hicks, Manhasset, N.Y., assignor to Centaur Products Corporation, Manhasset, N.Y., a corporation of New York Application March 15, 1956, Serial No. 571,658

7 Claims. (Cl. 88—16.2)

This invention relates to motion picture cameras and more especially to apparatus for recording sound at the time that the motion picture is made.

It is an object of the invention to provide a sound recording attachment which can be applied to existing motion picture equipment. Another object is to provide such an attachment which requires no connection with the motion picture camera, but can be attached to the film magazine used with the camera.

Still another object is to provide a sound recording attachment which is driven by the film in the magazine and which, therefore, requires no motor and no mechanical connection with the operating mechanism of the camera.

One feature of the invention relates to a construction by which the sound attachment is connected to the film magazine without making any changes in the connection of the film magazine to the camera and without any extensive alterations in the housing of the film magazine.

Other objects, features and advantages of the invention will appear or be pointed out as the description proceeds.

In the drawing, forming a part hereof, in which like reference characters indicate corresponding parts in all the views:

Figure 1 is a diagrammatic side view of a motion picture camera of the prior art to which the sound attachment of this invention can be attached;

Figure 2 is a greatly enlarged diagrammatic view of the magazine shown in Figure 1 with the sound attachment of this invention connected to the upper part of the magazine;

Figure 3 is a sectional view taken on the line 3—3 of Figure 2; and

Figure 4 is a diagrammatic view of the sound recording attachment viewed from the back, that is, from the plane 4—4 of Figure 3, with the cover of the housing removed.

Figure 5:
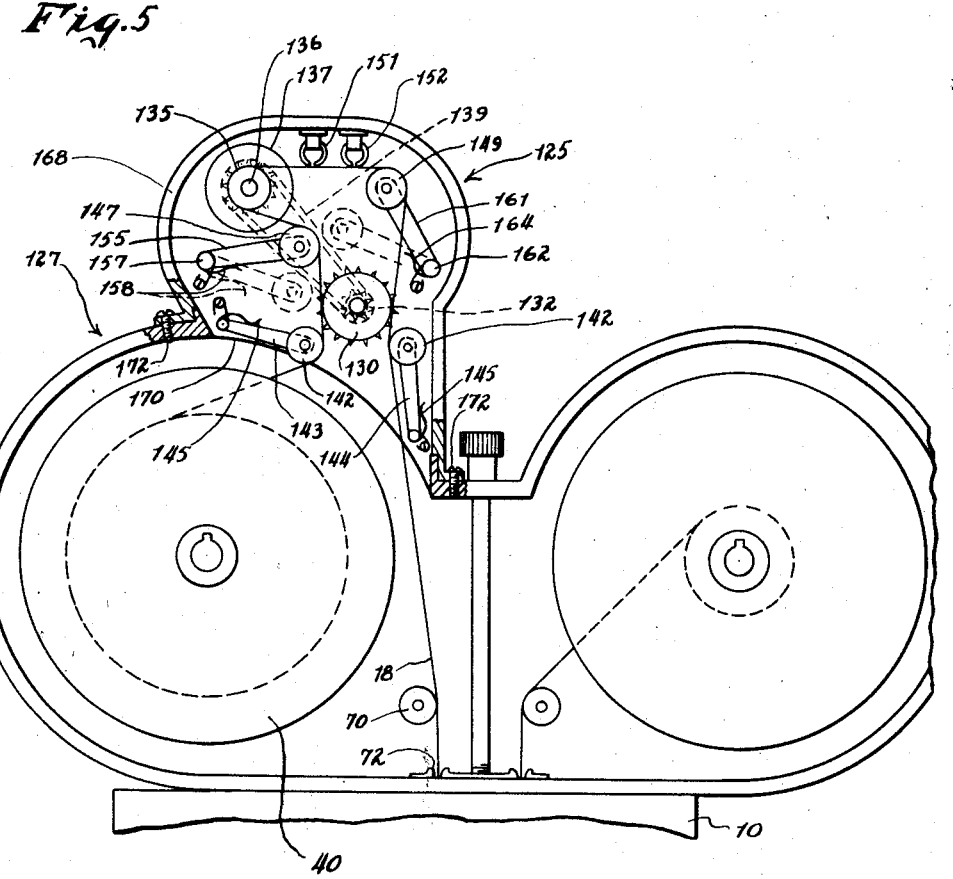
Figure 5 shows a modified construction for recording a sound track on a photographic film which has been striped for a magnetic track.

The camera shown in Figure 1 includes a camera housing 10 with a lens mount 12 at one end of the housing and a film magazine 14 attached to the top of the housing. The film magazine is removable, and there is a screw 16 by which the magazine is attached to the housing.

Motion picture film 18 comes from the magazine 14 through an opening in the housing 10, and passes downwardly to a driving sprocket 22. There are rollers 23 at angularly spaced regions around the driving sprocket 22. This driving sprocket runs continuously with uniform motion and is driven by a motor 24.

The driving sprocket 22 supplies the power for withdrawing the film 18 from the magazine 14. After passing around an arc of the driving sprocket 22, the film 18 passes to an exposure station designated generally by the reference character 28. The motion at the exposure station is intermittent and is produced by a claw pulldown 30 operated from cam mechanism 31 driven by the motor 24.

In order to permit intermittent motion at the exposure station 28 and continuous motion at the driving sprocket 22, a loop 32 is formed in the film between the driving sprocket and the exposure station; and the average speed of the film at the sprocket 22 and past the exposure station 28 is equal so that the size of the loop 32 merely fluctuates but contains the same average length of film.

A shutter 34 rotates in front of the film at the exposure station in accordance with conventional practice. Beyond the exposure station there is another loop 32 in the film and beyond this loop the film passes around another arc of the driving sprocket 22, and then upwardly into the magazine 14. Rollers 36 hold the film in contact with the sprocket 22 beyond the loop 32.

The motion picture camera thus far described is conventional and is merely representative of motion picture cameras in which film is drawn from a film magazine at constant speed.

The motion picture camera shown in Figure 1 may also be equipped with sound recording apparatus which extends into position to supply light for exposing an optical sound track along one edge of the continuously moving film 18.

Within the film magazine 14 there is a supply reel 40 supported on an axle 41. There is also a takeup reel 43 supported by an axle 44. The exposed film from the camera is wound on the takeup reel 43, and this reel has a pulley on an end of the axle 44 which extends through the side of the magazine. The pulley is driven by a belt 48 from a pulley on the camera, and this belt slips as necessary to maintain a torque on the axle 44 at all times without requiring the axle to turn at any particular speed. This structure for driving takeup reels of film magazines is also conventional and well understood in the art.

Figure 2 shows the film magazine 14 with an opening at the top of the magazine covered by a part of a sound attachment 50. The sound attachment has a film sprocket 52 with conventional teeth for engaging the sprocket openings in the film 18. This sprocket 52 is secured to a shaft 54. There are guide rollers 56 and 57 at opposite sides of the sprocket 52. The guide roller 56 is carried on an arm 59 which swings about a stud 60 extending from the back wall of the magazine.

A spring 62 is wrapped around the stud 60. One end of this spring 62 bears against the lower face of the arm 59, and the other end of the spring 62 is fixed by a screw 64 threaded into the back wall of the film magazine. This spring 62 urges the arm 59 upwardly into the position shown in solid lines, but the arm 59 can be swung downwardly into the position indicated by dotted lines.

The roller 57 is carried by an arm 67 which swings about a stud 68. This arm also has a spring 62 urging it to swing upwardly.

When the end of the film 18 is originally threaded into the camera, the rollers 56 and 57 are moved downwardly into the dotted line positions, and the film is passed across the tops of these rollers and below the sprocket 52. The film 18 is then led downwardly across a guide pulley 70 through a light trap 72 and into the camera. As soon as the operator releases the rollers 56 and 57, the springs 62 push the rollers upwardly and move a length of the film 18 into contact with the sprocket 52. During the operation of the camera, the film 18 is withdrawn from the magazine at a uniform rate, as previously explained, and this causes the sprocket 52 to rotate at uniform speed.

There is an important advantage in this construction with the rollers 56 and 57 on the arms 59 and 67 which extend into the part of the magazine close to the periphery of the film reels. The chamber of the magazine 14, in which the supply reel 40 is located, is closed by a threaded cover, best shown in Figure 3. The only access to the magazine feed compartment is through the opening closed by this detachable threaded cover. When once screwed on, the cover guards against the entrance of any light.

The construction shown obviates the necessity for any detachable cover on the portion of the magazine which houses the sprocket 52, because the movement of the arms 59 and 67, into the dotted line positions shown in Figure 2, makes it possible to thread the film into engagement with the sprocket 52 without having any access through the side of the chamber in which the sprocket 52 is located.

Figure 3 shows the shaft 54 extending through a bearing 76 on the magazine housing. In the illustrated embodiment of the invention the extended part of the magazine is at the top, but it will be understood that this attachment can be placed anywhere around the circumference of the portion of the magazine which houses the supply reel.

There is another bearing 78 attached to the wall of the magazine for supporting a shaft 80 which extends parallel to the shaft 54 at a substantial distance from this shaft 54. There are sprockets 82 and 83 on the shafts 54 and 80, respectively; and there is an endless sprocket chain 85 which passes around these sprockets for transmitting rotary motion of the shaft 54 to the shaft 80.

A film sprocket 88 has conventional teeth for engaging sprocket openings in a sound film strip 90. This film strip 90 is preferably a magnetic film strip which unwinds from a supply reel 92 supported by an axle 93 (Figure 4) extending from a bracket 95 which is attached to the wall of the film magazine by screws 96.

The magnetic film 90 passes around an arc of the sprocket 83 and then travels to a takeup reel 98 on an axle 99. The takeup reel 98 is driven from a pulley 100 on the shaft 54. There is a pulley 102 on the axle 99 of the supply reel; and rotation of the driving pulley 100 is transmitted to the takeup reel pulley 102 by a slipping belt 104 which is similar to the belt used for driving the takeup reel of the motion picture camera. The axle 99 turns in a bearing in a bracket 106 which is connected to the wall of the magazine by screws 107.

It will be understood that the chain 85 and the chain sprockets 82 and 88 can be omitted, and the film sprocket 83 can be mounted directly on the shaft 85 if there is no necessity for obtaining a change in speed between the shaft 54 and the sprocket 83. The desired speed for the magnetic sound film 90 depends upon several different considerations. One is the size of photographic film used by the camera and the other is the quality of the sound track desired. The larger the photographic film, the faster will be the speed of rotation of the shaft 54. Sixteen millimeter film is ordinarily run at a speed of 7.2 inches per second and this is fast enough for high quality sound tracks.

With eight millimeter film, the film speed is substantially slower and a higher speed for the sound film is used if a high quality recording is called for. However, it is possible to record sound at 3.75 inches per second, the speed of 8 mm. film. Even if the sound film is to run at a different speed from the photographic film, some different in speed ratio can be obtained even with the sprocket 83 on the shaft 54 by having the sound film sprocket of a different diameter from the sprocket 52 (Figure 2) by which the shaft 54 is rotated.

There are magnetic heads 111 and 112 (Figure 4). In the construction illustrated, these heads are positioned at the driven sprocket 83 in position to contact with the coating on the magnetic film 90, but the magnetic heads 111 and 112 can be located at other places along the path of the film 90 such as are well known to constitute a flutter-reduction combination of film loops, pulleys, arms, drums and stabilizers. The invention uses at least two magnetic heads, one being used for recording the magnetic sound track and the other for immediate playback in accordance with conventional practice.

When recording stereophonic sound it is necessary to have additional magnetic heads; and the heads 111 and 112 are merely representative of plural sound heads located along the course of the magnetic film 90.

By adjusting the magnetic heads 111 and 112 transversely of the sound film 90, parallel sound tracks can be recorded on the film 90.

Referring again to Figure 3, the front of the recording attachment is closed by a removable cover 120 which may be conveniently opened for changing the sound record or magnetic tape. When not recording stereophonic sound, the invention can be used with reels of magnetic tape equal in length to the picture film or substantially shorter. If the magnetic film 90 runs at a slower speed than the picture film, it can be of shorter length than the picture film.

Even if the magnetic film 90 is to be run at a faster speed than the picture film, it can still be of shorter length if parallel tracks are recorded on the sound film by running the total length of the sound film several times for one running of the photographic film. One advantage of using shorter sound films is that the reels for the sound films can be smaller. However, magnetic sound films are usually thinner than photographic films and this reduces the necessary diameter of the sound film reels even though the footage of sound film is equal to the footage of photographic film on the reels used in the film magazine.

It will be understood that the sound recorded on the magnetic tape 90 is re-recorded at the studio to make a permanent sound record for use with the motion picture film and there is no objection, therefore, to having a sound record which is on several parallel tracks. This makes the sound recording attachment smaller than the film magazine, but the recording attachment of this invention can be made of any desired size depending upon the number of feet of magnetic tape which it is desired to include on the housing.

After a magazine has been used for the purpose of photographing pictures in the camera, and the side recorder has had its magnetic film run for the purpose of recording the sound accompanying the picture, it is possible to run the camera backwards and re-record the magnetic sound track to an optical sound track alongside the picture film, so that, when this film is developed, it will contain both picture and sound images. This re-recording can be done in the same camera (if the camera is so equipped with optical modulator as in Figure 1) or in another camera or photographic sound recording machine. At the same time the rerecording is going on, another sound track can also be made; either on another piece of photographic film which in turn can be developed and matched with the picture film, or on another magnetic sound film roll, either 35 mm. or 16 mm., if this is the medium which the producer desires to employ in the editing of the film.

If a camera is equipped with both an optical sound recording device and the magnetic sound recorder of this invention, the recording in the field can be done with the magnetic recording attachment, thus eliminating the uncertainty of optical recording under the diverse conditions encountered in the field. Afterwards the optical track can be made, from the magnetic record, under technical conditions of strict control, and in the same magazine or camera, if desired.

It is also possible to make a rerecording from the magnetic magazine roll to a photographic film in the magazine after the picture film has been removed, by merely inserting a common type of positive film in the magazine, then threading the magazine in either a camera having a modulator or in a conventional optical sound recording machine which will accommodate the particular magazine, or which has an adapter which will allow the camera magazine to be fitted to the recorder.

Figure 5 shows another construction in which a bulge 125 is provided on the housing of a magazine 127 which attaches to a camera in the same way as the magazine 14 shown in Figure 1. The magazine 127 of Figure 5, however, has the magnetic sound recording equipment housed in the bulge 125.

This modified construction shown in Figure 5 is for use with photographic film having a prestriped magnetic track alongside the picture area of the film. The film 18 passes from the supply reel 40 to a sprocket 130 secured to a shaft 132 that turns in a bearing in the side wall of the magazine. A drum 135 secured to a shaft 136 with a flywheel 137 is driven from the shaft 132 by a sprocket chain 139 and in a manner similar to the driving connection between the shaft 54 and the sprocket 83 in the construction shown in Figure 4. The shaft 136 of Figure 5 extends through the side of the magazine so that the drum 135 can be located in the bulge 125 of the magazine 127.

The film 18 is held in contact with the sprocket 130 by rollers 142 on arms 143 and 144. These arms 143 and 144 are pivotally connected to the wall of the magazine 127, and then are urged by springs 145 in the direction necessary to hold the film in contact with the sprocket 130. The rollers 142 are moved away from the sprocket 130 for the purpose of threading the film 18 through the apparatus.

From the sprocket 130, the film 18 passes around a slack take-up roller 147 and then around the drum 135. Beyond the drum 135, there is a straight run of the film 18 to a guide roller 149 which holds the film in contact with two magnetic heads 151 and 152. The first of the heads 151 is for recording the magnetic track and the second head 152 is for immediate playback, as already described in connection with the structure shown in the other views.

The roller 147 is carried by an arm 155 which has angular movement about a pivot connection 157 on the wall of the magazine. A spring 158 urges the arm 155 to move counterclockwise about the pivot connection 157. The roller 149 is carried on an arm 161 which moves angularly about a pivot connection 162 on the magazine wall, and a spring 164 urges this arm 161 in a clockwise direction.

Because of the inaccessibility of the parts in the bulge 125 from the chamber of the magazine in which the film supply reel 40 is located, a cover 168 is provided on the magazine for enclosing the bulge 125. This cover 168 joins the magazine along a seam 170 which has an offset face serving as a light trap. The cover 168 is attached to the magazine by detachable fastening means, shown in Figure 5 as screws 172 threading into the top wall of the magazine.

The preferred construction of the invention has been illustrated diagrammatically and described herein, but various changes and modifications can be made and some features can be used in different combinations without departing from the invention as defined in the claims.

What is claimed is:

1. In motion picture apparatus of the class wherein a picture film supply reel is located in a film magazine and there is a film feed by which film is withdrawn from the supply reel at uniform speed across guide means and by motor-operated sprocket means, the combination with said magazine of sound apparatus having a sound film supply and a take-up reel, a sound head located at a sound station along a run of the sound film passing from the supply of the take-up reel of the sound apparatus, a film-driven sprocket on an axle located adjacent to a run of the picture film in the magazine and between the picture film supply reel and the motor-operated sprocket means and over which the picture film runs to impart the rotation to said film-driven sprocket, a driving sprocket for the sound film, an axle for the driving sprocket rotatable about an axis remote from the axis of the axle of the film-driven sprocket, motion transmitting connections by which the driving sprocket for the sound film is driven from the film-driven sprocket and in unison therewith, the peripheral speed of the driving sprocket for the sound film and the resulting lineal speed of the sound film being dependent upon the ratio of diameters of the sprockets and the mechanical advantage of said motion transmitting connections.

2. The sound recording apparatus described in claim 1 and in which the film magazine is detachable from the camera and the sound recording apparatus is supported from the film magazine.

3. The sound recording apparatus described in claim 1 and in which the film magazine is connected to the camera by detachable fastening means and the sound recorder is supported from the film magazine.

4. The sound recording apparatus described in claim 1 and in which the camera uses photographic film having sprocket openings extending in a row lengthwise of the film and the wheel that contacts with the film has teeth for engaging the sprocket openings in the film, and there are rollers holding an arc of the film against the wheel, detachable fastening means connecting the magazine to the camera, and the sound recorder is in integral unit with the film magazine and removable from the camera therewith.

5. The sound recording attachment described in claim 1 and in which the sound strip is a magnetic tape of substantially shorter length than the photographic film with which it is intended to be used, and means at the recording station for selectively and successively recording different parallel sound tracks on the tape.

6. A sound recording attachment for operation with a motion picture camera that has motor-operated mechanism for advancing a photographic film with substantially uniform speed along at least a portion of the path of travel of the film, and that has a film magazine from which film is withdrawn from a supply reel at said substantially uniform speed, and detachable fastening means connecting the film magazine to the camera, said sound recording attachment being supported from the film magazine and being an integral unit therewith, the film magazine having a wall and the film supply reel and film being on the inside of the wall but most of the sound recording attachment being located on the outside of the wall of the magazine, the sound recording attachment comprising a shaft which extends through said wall, a wheel on the end of the shaft adjacent to the photographic film in the magazine and with teeth thereon for engaging sprocket openings in the photographic film along a run of the film which moves at uniform speed, resiliently mounted rollers in the film compartment of the magazine holding the film against an arc of the wheel, a supply reel and a takeup reel for a magnetic sound strip located on the outside of the wall, a recording station between the sound strip supply and takeup reels, feed mechanism for advancing the sound strip past the recording station, motion-transmitting connections through which the feed mechanism is operated from said shaft, other motion-transmitting mechanism through which the takeup reel is operated from said shaft through a friction drive, at least one magnetic recording head at the recording station, the magnetic sound strip being substantially shorter in length than the motion picture film in the magazine, and means at the recording station for selectively recording different parallel tracks on the sound strip during successive runs of the sound strip corresponding to different portions of the length of the photographic film.

7. In motion picture apparatus wherein a motion picture camera has a motor-operated mechanism for advancing a photographic film with substantially uniform speed along at least a portion of the path of travel of the film, and has a film magazine with walls forming a light-tight chamber that encloses the film and from which film is withdrawn at said substantially uniform speed, and detachable fastening means connecting the film magazine to the camera, the combination with said magazine of a film-driven sprocket located within the magazine along a run of the film that is moving at said substantially uniform speed, a shaft secured to said sprocket and extending through a side wall of the magazine, a sound recording attachment including supply and take-up reels for a sound strip, a recording station between the supply and take-up reels, feed mechanism for advancing the sound strip past said recording station, the sound recording attachment being carried by the magazine and being located on the outside of said side wall and including a chamber enclosing the recording station, a removable cover closing the chamber of the recording attachment for access to the sound strip while the film chamber of the magazine remains closed and light tight, and driving mechanism through which the feed mechanism of the recording attachment is driven from said shaft.

References Cited in the file of this patent

UNITED STATES PATENTS

| | | |
|---|---|---|
| 1,786,301 | Heisler | Dec. 23, 1930 |
| 1,866,712 | Jones | July 12, 1932 |
| 1,877,731 | Kuchenmeister | Sept. 13, 1932 |
| 2,064,049 | Wurm et al. | Dec. 15, 1936 |
| 2,379,489 | Kreuzer | July 3, 1945 |
| 2,532,761 | De Blasio | Dec. 5, 1950 |
| 2,681,591 | Nyman | June 22, 1954 |

OTHER REFERENCES

"Photography" Magazine, vol. 34 (issue #4), page 110, April 1954.

"Popular Photography" Magazine, December 1955, pages 176–177.